(12) United States Patent
Glatfelter et al.

(10) Patent No.: US 10,621,715 B2
(45) Date of Patent: Apr. 14, 2020

(54) SYSTEM AND METHOD FOR GENERATING ENHANCED STEREOGRAHIC VIDEOS OF AIRCRAFT BUILD PROCESSES

(71) Applicant: The Boeing Company, Chicago, IL (US)

(72) Inventors: John W. Glatfelter, West Chester, PA (US); Chong Choi, Media, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/600,271

(22) Filed: Oct. 11, 2019

(65) Prior Publication Data

US 2020/0043158 A1  Feb. 6, 2020

Related U.S. Application Data

(63) Continuation of application No. 15/209,733, filed on Jul. 13, 2016, now Pat. No. 10,445,867.

(51) Int. Cl.
  *G06T 7/00* (2017.01)
  *G06T 19/20* (2011.01)
  (Continued)

(52) U.S. Cl.
  CPC ........ *G06T 7/0004* (2013.01); *G05B 19/4183* (2013.01); *G05B 19/41805* (2013.01); *G05B 19/41885* (2013.01); *G06T 19/006* (2013.01); *G06T 19/20* (2013.01); *G05B 23/0235* (2013.01); *G05B 2219/31472* (2013.01);
  (Continued)

(58) Field of Classification Search
  None
  See application file for complete search history.

(56) References Cited

U.S. PATENT DOCUMENTS

| 9,187,188 | B2 | 11/2015 | Richter et al. |
| 10,445,867 | B2 | 10/2019 | Glatfelter et al. |

(Continued)

FOREIGN PATENT DOCUMENTS

EP  2916189 A1  9/2015

OTHER PUBLICATIONS

"U.S. Appl. No. 15/209,733, Examiner Interview Summary dated May 31, 2019", 1 pg.

(Continued)

*Primary Examiner* — David Perlman
(74) *Attorney, Agent, or Firm* — Kwan & Olynick LLP

(57) ABSTRACT

Provided is a system and method for generating enhanced stereographic videos of aircraft build processes. Specifically, the system comprises a stereoscopic recording device configured to capture a plurality of stages of an aircraft build process. The system further comprises one or more processors, memory, and one or more programs stored in the memory that comprise instructions for execution by the system to build a stereographic library including repositories of 3D video corresponding to the plurality of stages of the aircraft build process. The system then generates an enhanced walkthrough video of the aircraft build process. The enhanced walkthrough video may include a parallax grid overlay and/or a thermal scan overlay integrated into the video. The system may then analyze the enhanced walkthrough video using post-processing analytics to identify anomalies and irregularities that occurred during the aircraft build process.

20 Claims, 14 Drawing Sheets

(51) Int. Cl.
  *G05B 19/418* (2006.01)
  *G06T 19/00* (2011.01)
  *G05B 23/02* (2006.01)

(52) U.S. Cl.
  CPC ............ *G06T 2200/08* (2013.01); *G06T 207/10021* (2013.01); *G06T 2207/20221* (2013.01); *G06T 2207/30108* (2013.01); *G06T 2207/30268* (2013.01); *G06T 2215/16* (2013.01); *Y02P 90/04* (2015.11)

(56) References Cited

U.S. PATENT DOCUMENTS

| | | |
|---|---|---|
| 2010/0211358 A1 | 8/2010 | Kesler et al. |
| 2012/0140041 A1 | 6/2012 | Burgunder et al. |
| 2012/0313933 A1 | 12/2012 | Tsukagoshi et al. |
| 2014/0189876 A1 | 7/2014 | Messinger et al. |
| 2014/0208163 A1 | 7/2014 | Domke et al. |
| 2015/0012171 A1 | 1/2015 | Richter et al. |
| 2015/0268469 A1 | 9/2015 | Marsh et al. |
| 2016/0075028 A1 | 3/2016 | Bain et al. |
| 2016/0300341 A1 | 10/2016 | Hay et al. |
| 2017/0052070 A1 | 2/2017 | Marsh et al. |
| 2018/0018764 A1 | 1/2018 | Glatfelter et al. |

OTHER PUBLICATIONS

"U.S. Appl. No. 15/209,733, Examiner Interview Summary dated Dec. 10, 2018", 1 pg.
"U.S. Appl. No. 15/209,733, Final Office Action dated Mar. 7, 2019", 7 pages.
"U.S. Appl. No. 15/209,733, Final Office Action dated Jul. 18, 2018", 28 pgs.
"U.S. Appl. No. 15/209,733, Non Final Office Action dated Jan. 4, 2018", 26 pgs.
"U.S. Appl. No. 15/209,733, Non Final Office Action dated Dec. 10, 2018", 7 pgs.
"U.S. Appl. No. 15/209,733, Notice of Allowance dated May 31, 2019", 8 pgs.
"European Application Serial No. 17181209.2, Search Report dated Jan. 5, 2018", 11 pgs.

SYSTEM AND METHOD FOR GENERATING ENHANCED STEREOGRAHIC VIDEOS OF AIRCRAFT BUILD PROCESSES

CROSS-REFERENCE TO RELATED APPLICATIONS

This application is a continuation of U.S. patent application Ser. No. 15/209,733, entitled: "SYSTEM AND METHOD FOR GENERATING ENHANCED STEREOGRAPHIC VIDEOS OF AIRCRAFT BUILD PROCESSES" filed on Jul. 13, 2016, now issued as U.S. Pat. No. 10,445,867 on Oct. 15, 2019, which is incorporated herein by reference in its entirety for all purposes.

BACKGROUND

During the manufacturing process of an aircraft, it is difficult for customers to gain an understanding of the progress of their product being built. Currently, customers must physically travel to the factory in order to review the manufacturing progress of an aircraft or other large-scale product with high costs. This may involve a travel itinerary that includes significant costs (e.g. airfare, hotel, car rental, etc.) leading to a brief physical walkthrough of the final product, usually in the final aircraft acceptance position. If multiple reviews are desired, the process must be repeated adding additional cost and time for the customer. Companies have attempted to utilize virtual showrooms of the computer aided design (CAD) data. However, virtual showrooms only present the expected end-state of the aircraft and not an actual view of the aircraft at different stages of the build process. Thus, there is a need for an improved system and method for supporting inspection of an aircraft at different stages of the build process that is more cost-effective and time-efficient than current methods.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are various systems and methods for generating enhanced stereographic videos of aircraft build processes. In various embodiments, a system comprises a stereoscopic recording device configured to capture a plurality of stages of an aircraft build process. The system further comprises one or more processors, memory, and one or more programs stored in the memory. The one or more programs may comprise instructions for building a stereographic library including repositories of 3D video organized by tail number. The repositories of 3D video may correspond to the plurality of stages of the aircraft build process.

The one or more programs further comprise instructions for generating an enhanced walkthrough video of the aircraft build process. The enhanced walkthrough video may include one or more of the following: a parallax grid overlay integrated into the video, and a thermal scan overlay integrated into the video. The parallax grid may include a plurality of parallax lines determined automatically using autofocus. The plurality of parallax lines may be organized as one or more sets of parallax lines. Each set of parallax lines may be stored as a separate video layer in the parallax grid overlay. The parallax grid may be configured such that accurate real-life measurements for locations, spacing, and aircraft structures can be extracted from the enhanced walkthrough video. The system may be configured to provide remote in-process initial inspections capabilities.

The one or more programs further comprise instructions for analyzing the enhanced walkthrough video using post-processing analytics to identify anomalies and irregularities that occurred during the aircraft build process. In some embodiments, the post-processing analytics includes analyzing patterns and shapes to detect foreign object damage. In some embodiments, the post-processing analytics includes analyzing patterns and shapes to determine assembly and sub-assembly compliance. In some embodiments, the post-processing analytics includes analyzing patterns and shapes to determine thermal gradient compliance.

Provided also is a method for generating enhanced stereographic videos of aircraft build processes. According to various embodiments, the method comprises capturing a plurality of stages of an aircraft build process via a stereoscopic recording device. The method further comprises building a stereographic library including 3D repositories of video organized by tail number. The 3D repositories of video may correspond to the plurality of stages of the aircraft build process. The method further comprises generating an enhanced walkthrough video of the aircraft build process, the enhanced walkthrough video including one or more of the following: a parallax grid overlay integrated into the video, and a thermal scan overlay integrated into the video. The enhanced walkthrough video may be configured to allow remote in-process initial inspections. The method further comprises analyzing the enhanced walkthrough video using post-processing analytics to identify anomalies and irregularities that occurred during the aircraft build process.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the aforementioned features. These and other embodiments are described further below with reference to the figures.

DETAILED DESCRIPTION

Figure 1:
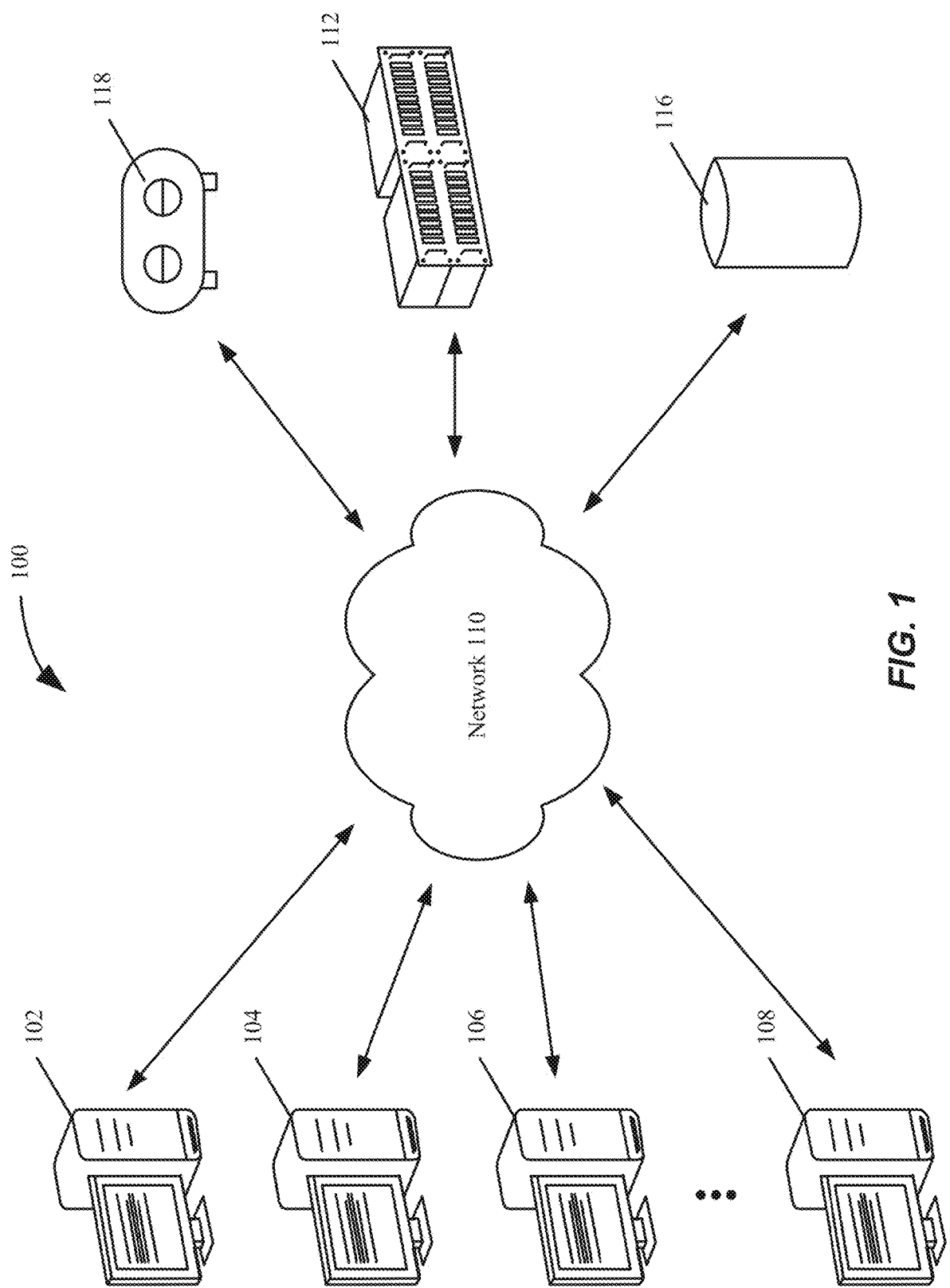
FIG. 1 illustrates a diagram of an example network architecture for implementing various systems and methods of the present disclosure, in accordance with one or more embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular systems used for aircraft fabrication. However, it should be noted that the techniques and mechanisms of the present disclosure apply to generating enhanced videos for different build processes in various other industries. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The present disclosure describes a novel system and method for providing improved virtual inspection of aircraft build processes. The system provides remote access for customers to view the periodic progress of the manufacture of an assembly product by remotely accessing video data acquired during the assembly with a recording device. Specifically, the system may include building a stereographic library including repositories of 2D and/or 3D images, including video, captured by a recording device, such as a stereoscopic camera. The recording device may be wearable by an operator such that video data is obtained while an operator walks through the assembly and provides a view of portions of the assembly of interest to a customer. The repositories of images may correspond to one or more stages of the aircraft build process and may be organized by aircraft tail number. The 2D and/or 3D images may be panoramic images with true perspective that can provide up to a 360 degree view of the interior and exterior of the aircraft and a more realistic and comprehensive view of a particular build stage as compared to current panoscans and other methods.

In some embodiments, parallax lines, including station-lines, butt-lines, and water-lines, may be generated for each captured image by a laser projection device equipped with autofocus capabilities. The parallax lines may be organized as sets of one or more grouped parallax lines, and each set of parallax lines may be stored as an overlay. The parallax lines may be evenly spaced at a predetermined distance (e.g., 5", 10", 12", 18", etc.) and provide scaling and perspective for the aircraft structure in horizontal, vertical, and longitudinal directions. In addition, the system may capture other information relevant to each build stage, such as foreign object damage, assembly compliance, and thermal deviation. This additional information may be stored in various overlays either separately and/or in combination. The one or more overlays may be activated (e.g. turned on/off) as needed to support engineering analysis and/or customer inspection. Post-processing analytics may be employed to automatically compare the captured images against database information to detect foreign object damage, determine assembly and sub-assembly compliance, and determine thermal gradient compliance.

The improved system has many advantages in comparison with conventional systems and methods for providing inspection of aircraft structures. For example, the disclosed system creates a library of videos and images of multiple build stages that may be conveniently accessed on demand from any location for virtual inspection of an aircraft structure. This eliminates the need for costly and time consuming travel to the physical location of the aircraft. Additionally, the system can provide undistorted 3D images with a larger field of view for more accurate perspective compared to traditional panoscans. One having ordinary skill in the art would recognize that current use of panoscans present distortions and limited range of view making it difficult to visualize areas outside of the view of reference and to scale the structures shown in the image.

Furthermore, parallax line overlays provide accurate measurements for locations, spacing, and aircraft structures, while thermal scan overlays allow technicians to safely and quickly identify potential system malfunctions. Post-processing analytics may also improve quality control by automatically identifying foreign object damage ("FOD"), determining assembly compliance, and/or analyzing thermal deviation. Overall, the improved system and methods may result in early identification of manufacturing issues and deviations from customer requirements resulting in significant cost savings and more accurate builds for both manufacturers and customers.

Example Embodiments

FIG. 1 illustrates a diagram of an example network architecture 100 for implementing various systems and methods of the present disclosure, in accordance with one or more embodiments. The network architecture 100 includes a number of client devices 102-108 communicably connected to server system 112 by a network 110. In some embodiments, server system 112 includes one or more processors and memory.

The processors of server system 112 execute computer instructions (e.g., network computer program code) stored in the memory to perform functions of a network data exchange server.

In some embodiments, server system 112 is a content server configured to receive and store repositories of video and/or image files recorded by recording device 118. Server system 112 may also function as a dispatch server configured to transmit and/or route network data packets including network messages. In some embodiments, the network architecture 100 may further include database 116 communicably connected to client devices 102-108 and server system 112 via network 110. In some embodiments, network data, stereographic libraries including 3D video repositories, or other information such as network profile information, aircraft information, manufacturing information, build process information, etc., may be stored in and/or retrieved from database 116. In some embodiments, database 116 is a component within server system 112 and stored within memory of server system 112.

Users of the client devices 102-108 may access the server system 112 to participate in a network data exchange service. For example, the client devices 102-108 can execute web browser applications that can be used to access the data stored in server system 112 and/or database 116. In another example, the client devices 102-108 can execute software applications that are specific to the network (e.g., networking data exchange "apps" running on smartphones). Users interacting with the client devices 102-110 can participate in the network data exchange service provided by the server system 112 by accessing stored data and reviewing 3D video images and distributing digital content, such as text comments (e.g., messages inquiries, updates, announcements, replies).

In some implementations, the client devices 102-110 can be computing devices such as laptop or desktop computers, smartphones, personal digital assistants, portable media players, tablet computers, or other appropriate computing devices that can be used to communicate with an electronic network. In some implementations, the server system 112 can include one or more computing devices such as a computer server. In some implementations, the server system 112 can represent more than one computing device working together to perform the actions of a server computer (e.g., cloud computing).

Network 110 may be a wired and/or wireless network. In some implementations, the network 110 can be a public communication network (e.g., the Internet, cellular data network, dial up modems over a telephone network) or a private communications network (e.g., private LAN, leased lines).

Figure 2:
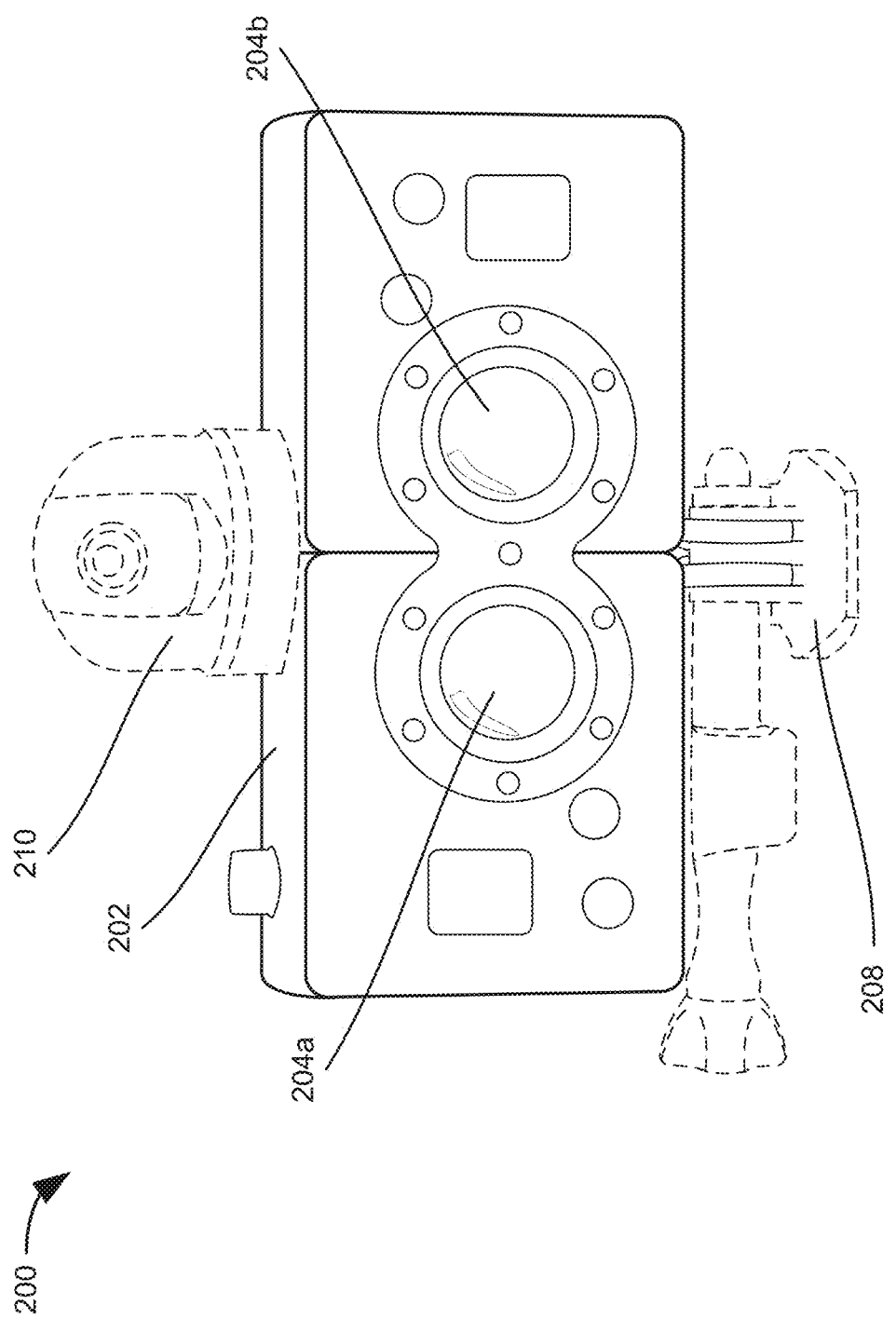
FIG. 2 is a schematic illustration of a stereoscopic camera that can be used in conjunction with the techniques and mechanisms of the present disclosure.

FIG. 2 is a schematic illustration of a stereoscopic camera 200 that can be used in conjunction with the techniques and mechanisms of the present disclosure. Dashed lines within FIG. 2 indicate optional components to stereoscopic camera 200. In some embodiments, stereoscopic camera 200 may be recording device 118 previously described in FIG. 1. In various embodiments, stereoscopic camera 200 includes a body 202 with two or more lenses, such as lenses 204a and 204b. Stereoscopic camera 200 may be configured to capture 2D and/or 3D video and/or images through stereo photography. Each lens, such as lenses 204a and 204b may include a separate image sensor and/or film frame allowing the camera to simulate human binocular vision and to capture 3D images. In some embodiments, stereoscopic camera 200 may be a combination of two or more image capturing devices. In some embodiments, stereoscopic camera 200 may include any other suitable lens mechanism for capturing 3D images, such as a 2D/3D interchangeable prime lens. In some embodiments, recording device 118 may comprise a plurality of cameras mounted such that the cameras capture a 360 degree panoramic view of the surroundings. Such a configuration of cameras may be coupled with smart processing software to create seamless panoramic displays in 2D and/or 3D. Panoramic video and/or images captured by stereoscopic camera 200 may provide up to a 360 degree view of the surroundings of the interior and/or exterior of an aircraft. In some embodiments, the panoramic video and/or images include a true perspective view that provides more accurate depth perspective and less view distortion than current panoscans, such as panoscans taken with a digital panoramic rotating line camera.

The body 202 of stereoscopic camera 200 may be coupled to a mount 208 allowing stereoscopic camera 200 to be mounted upon various structures. For example, in some embodiments, stereoscopic camera 200 may be mounted upon a rail system. In some embodiments, the rail system may allow stereoscopic camera 200 to rotate up to 360 degrees in order to capture a larger view of reference. In other embodiments, stereoscopic camera 200 may be mounted upon the helmet of an operator and may record video and/or images of portions of the assembly of interest to a customer as an operator travels along the interior and/or exterior of the aircraft during each incremental stage of manufacturing. The 3D images captured by stereoscopic camera 200 may then be formatted for viewing with appropriate 3D viewing devices, such as virtual reality goggles, etc.

In some embodiments, stereoscopic camera 200 may include a device attachment 210 mounted to an area of the body 202 of stereoscopic camera 200. As depicted in FIG. 2, mounted device 210 is mounted at the top of stereoscopic camera 200. However, mounted device 210 may be mounted on any portion of stereoscopic camera 200 in different embodiments. In some embodiments, stereoscopic camera 200 may include a plurality of mounted devices 210 mounted on various portions of body 202. In various embodiments, mounted device 210 may capture information that enhances or supplements the 3D image captured by stereoscopic camera 200. In one aspect, mounted device 210 may be a laser projection device with an autofocus capability for creating referential measurement lines as further described below with reference to FIGS. 4B-4E. In another aspect, mounted device 210 may comprise an infrared vision device for imaging thermal radiation as further described below with reference to FIG. 4F. Such mounted devices 210 may create synchronized overlays that provide additional information regarding the recorded images. In some embodiments, a mounted device 210 may comprise a lighting source to provide adequate and/or even lighting of the surroundings. The capabilities of one or more of the previously described device attachments 210 may be incorporated in and performed by stereoscopic camera 200.

Examples of Captured Images and Overlays

Figure 3B:
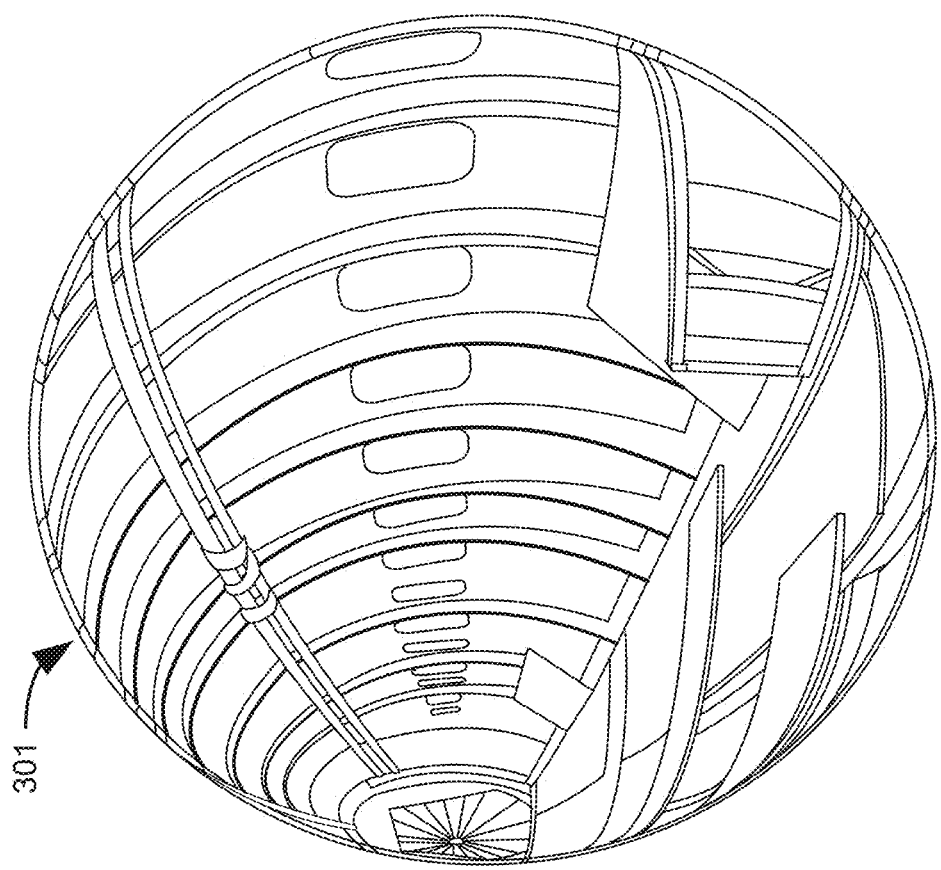
FIGS. 3A and 3B illustrate an example of an image of the interior of an aircraft and a panoscan of the image, in accordance with some embodiments.
Figure 3A:
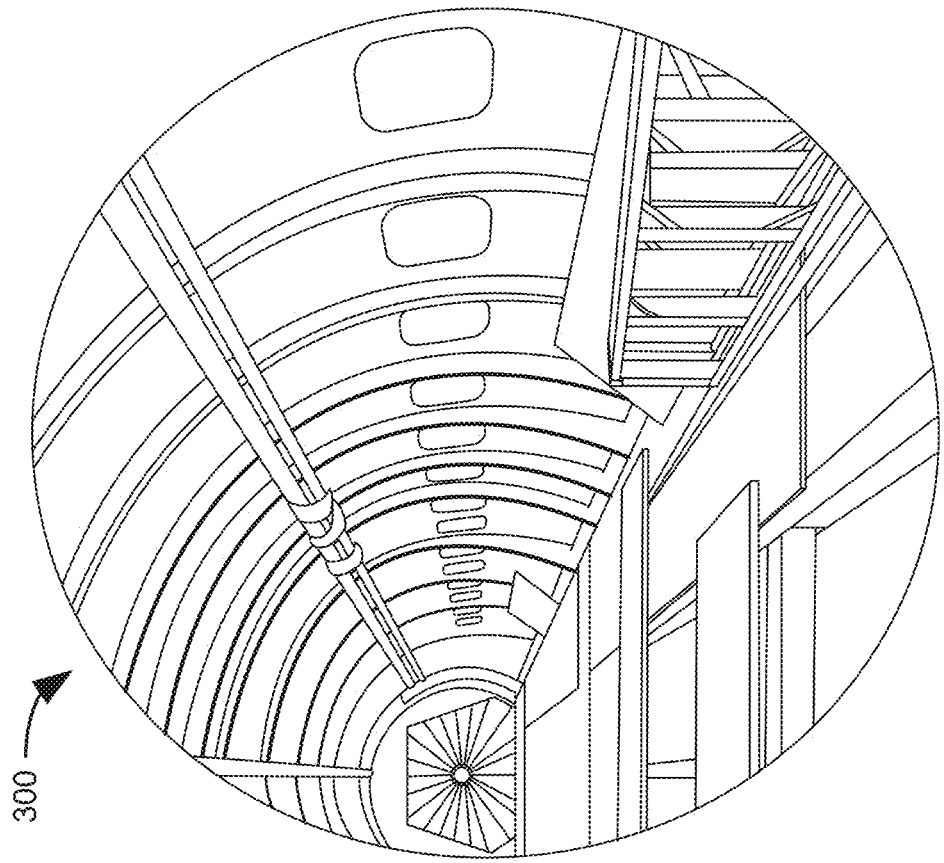

By capturing video and/or images with more accurate visual perspective, systems and methods of the present disclosure can avoid the problems of traditional panoscans, and other panoramic photography methods, currently used. FIGS. 3A-3B illustrate an example of an image 300 of the interior of an aircraft and a panoscan 301 of the image 300, in accordance with some embodiments. With reference to FIG. 3A, image 300 depicts the interior of an aircraft during a build stage. With reference to FIG. 3B, panoscan 301 may be a static panoramic image of the aircraft that is displayed and distorted in an extreme wide area lens format, and may be used in identifying potential locations for engineering equipment. In some embodiments, image 300 and/or panoscan 301 may be a frame in a video sequence. A panoscan, such as panoscan 301, may readily reveal hydraulic lines, electrical wires, and/or other engineering structures. However, the formatting causes distortions in the view (e.g., a fish eye effect), as shown in FIG. 3B. These distortions may make it difficult to visualize areas outside of the view of reference and to determine distances the structure shown in the image. Additionally, the view of reference is fixed at the center of the picture, and only limited movement is capable, such as zoom in, zoom out, and rotation, and such limited movements may cause the image to distort even further. Furthermore, fish-eye effect distortions creates difficulty in scaling the existing structures within a panoscan image, such as panoscan 301.

In contrast, a video and/or 360 degree image captured by recording device 118 displays an image with true visual perspective, allowing scaling through various means, such as by overlays of lines spaced evenly apart at known distances. Additionally, a 3D video and/or image would provide depth perception information not shown in traditional panoscan images. Furthermore a video and/or 360 degree image captured by recording device 118 is not locked into a particular static view point and would allow visualization of areas outside of the current view of reference.

Figure 4A:
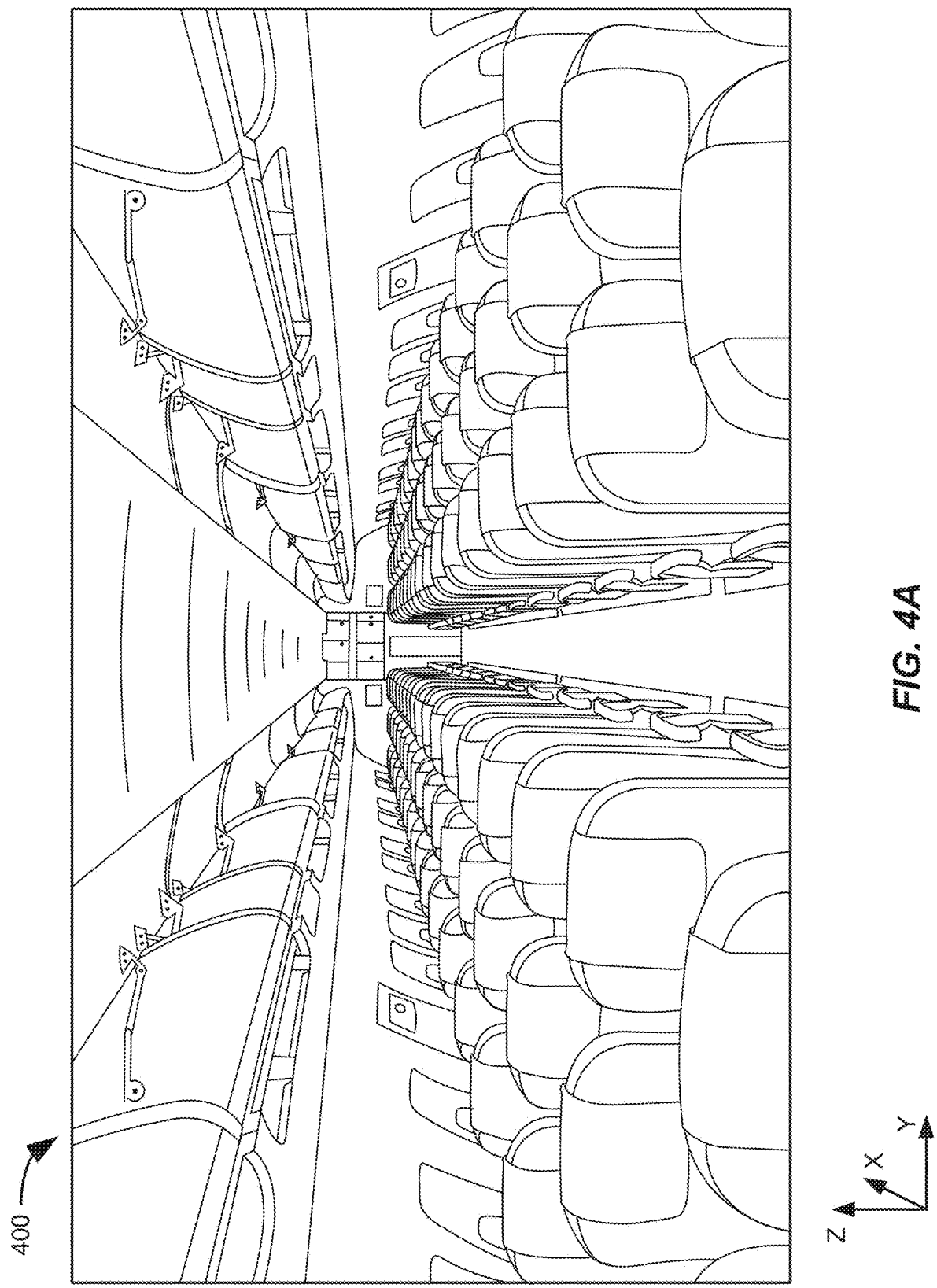
FIG. 4A illustrates an example of an image displaying the interior of an aircraft, in accordance with some embodiments.

The following figures provide additional examples of recorded images, such as those captured by recording device 118, or stereoscopic camera 200, and stored in server system 112 and/or database 116. FIG. 4A illustrates an example of an image 400 displaying the interior of an aircraft, in accordance with some embodiments. As depicted in FIG. 4A, image 400 includes a plurality of rows of seats, overhead compartments, and windows. Image 400 may be a frame of a recorded video. In some embodiments, image 400 may be a section of a 360 degree panoramic image or video. As depicted for ease of reference, image 400 is shown in a 2D perspective. However, image 400 may be a 3D video and/or image.

FIGS. 4B-4F illustrate examples of image 400 displaying the interior of an aircraft with various integrated overlays, in accordance with some embodiments. In some embodiments, overlays including parallax lines, such as station-lines, butt-lines, and water-lines, are layered onto the image for scaling and/or measurement purposes. Such overlays may be stored along with the captured images in server 112 and/or database 116. In some embodiments, autofocus features of recording device 118, or a mounted device 220, accounts for the distance within an image and creates parallax lines as needed to maintain a default and/or user-defined spacing. The parallax lines may be spaced evenly at a predetermined distance (e.g., 5", 10", 12", 18", etc.).

Figure 4B:
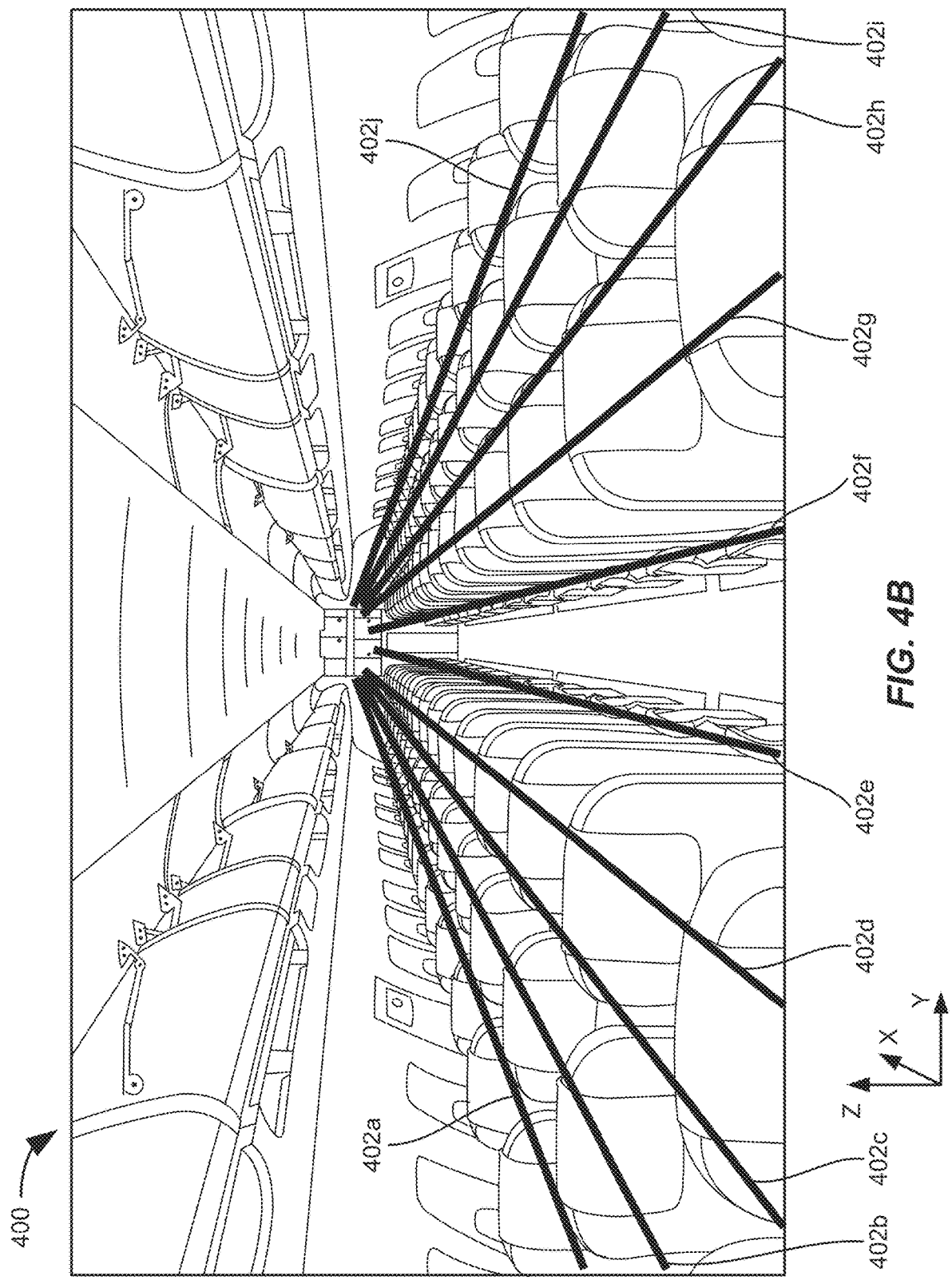
FIGS. 4B-4F illustrate examples of an image displaying the interior of an aircraft with an integrated overlay, in accordance with some embodiments.

FIG. 4B depicts image 400 with station-lines 402a-402j running parallel to the X-axis of an aircraft. Station-lines, such as station-lines 402a-402j generally designate locations along the length of the aircraft, run from the front of the structure to the rear, and are annotated at structurally significant items such as ribs. For example, a pipe that began at station 22 and ran straight to station 500 without any clamps or bends or holes would include only a reference to the start and stop points. In some embodiments, the origin of the fuselage station (FS=0 or x=0) is placed at the nose tip or some distance ahead of the nose (e.g., approximately 50 to 100 inches). Additionally, evenly spaced station-lines may provide perspective for horizontal distances of the structure in the Y-axis. For example, as previously described, parallax station-lines 402a-402j may be evenly spaced at a predetermined distance (e.g., 5", 10", 12", 18", etc.).

Figure 4C:
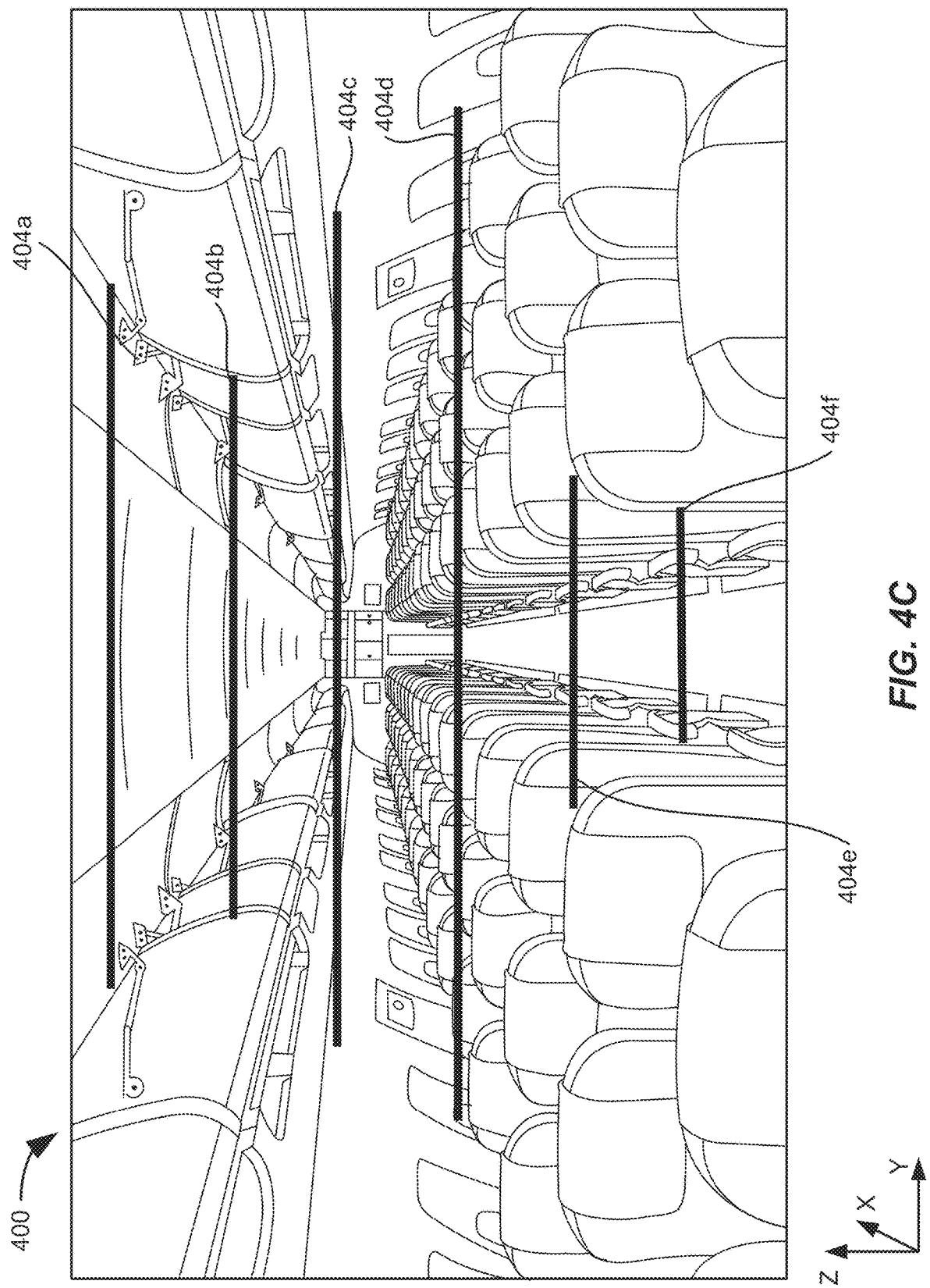

FIG. 4C depicts image 400 with butt-lines 404a-404f running parallel to the Y axis of an aircraft. Butt-lines, such as butt-lines 404a-404f generally measure left and right of the aircraft centerline. In some embodiments, the origin of the butt line (BL=0 or y=0) is located at the aircraft plane of symmetry. Additionally, evenly spaced butt-lines may provide perspective for vertical distances of the structure in the Z-axis. For example, as previously described, parallax butt-lines 404a-404f may be evenly spaced at a predetermined distance (e.g., 5", 10", 12", 18", etc.).

Figure 4D:
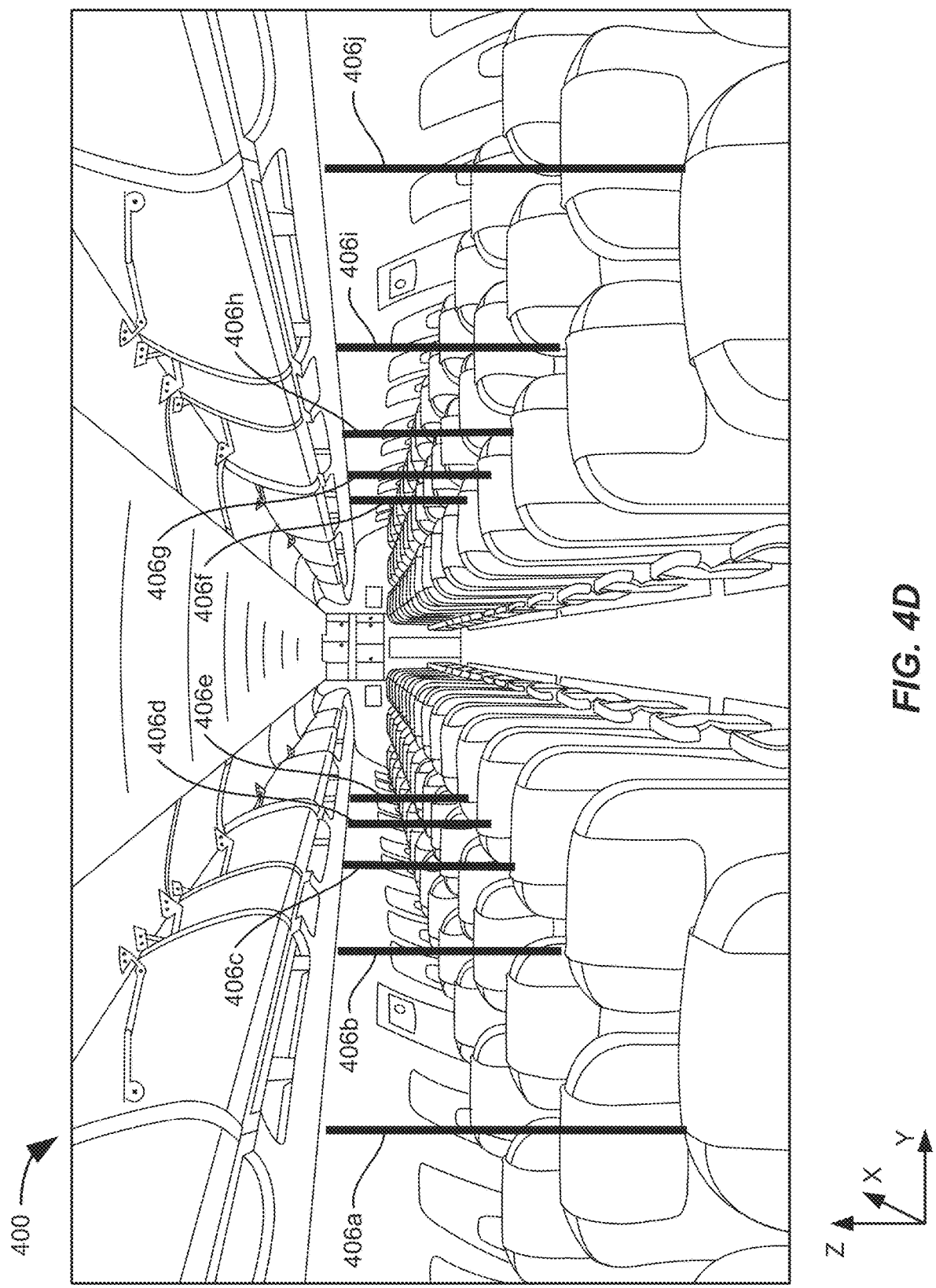

FIG. 4D depicts image 400 with water-lines 406a-406j running parallel to the Z-axis of an aircraft. Water-lines, such as water-lines 406a-406j generally designate location of important points in the height of the aircraft, from ground up (e.g., floor, ceiling, etc.). Typically, water-line 0 is generally a bit below the aircraft or the bottom of the fuselage. In some embodiments, the origin of the water line (WL=0 or z=0) is placed at the nose tip, at the ground, or approximately 100 to 200 inches below the nose tip. Additionally, evenly spaced water-lines may provide perspective for longitudinal distances of the structure in the X-axis. For example, as previously described, parallax water-lines 406a-406j may be evenly spaced at a predetermined distance (e.g., 5", 10", 12", 18", etc.).

A grid overlay may be created by using a laser projection device mounted on recording device 118 with an autofocus capability. Such laser projection device may be a mounted device 210. When pointed at an object, the laser projection device has the ability to create a grid of defined lines in any of the perpendicular X-, Y-, and/or Z-axes. In some embodiments, stereoscopic camera 200 may include components providing capabilities of a laser projection device. In some embodiments, a parallax grid overlay comprises one or more layers, where each layer includes a set of parallax lines. In some embodiments, a set of parallax lines may include a group of one or more parallel lines. In some embodiments, a set of parallax lines may include a group of one or more station-lines, butt-lines, and/or water-lines. The sets of parallax lines may be stored as meta data attached to the video and/or image format. For example, four specific channels may be captured: 1.) video and/or image, 2.) station-lines, 3.) butt-lines, and 4.) water-lines. In some embodiments, the captured data may be aggregated into a single file retrievable for viewing.

Figure 4E:
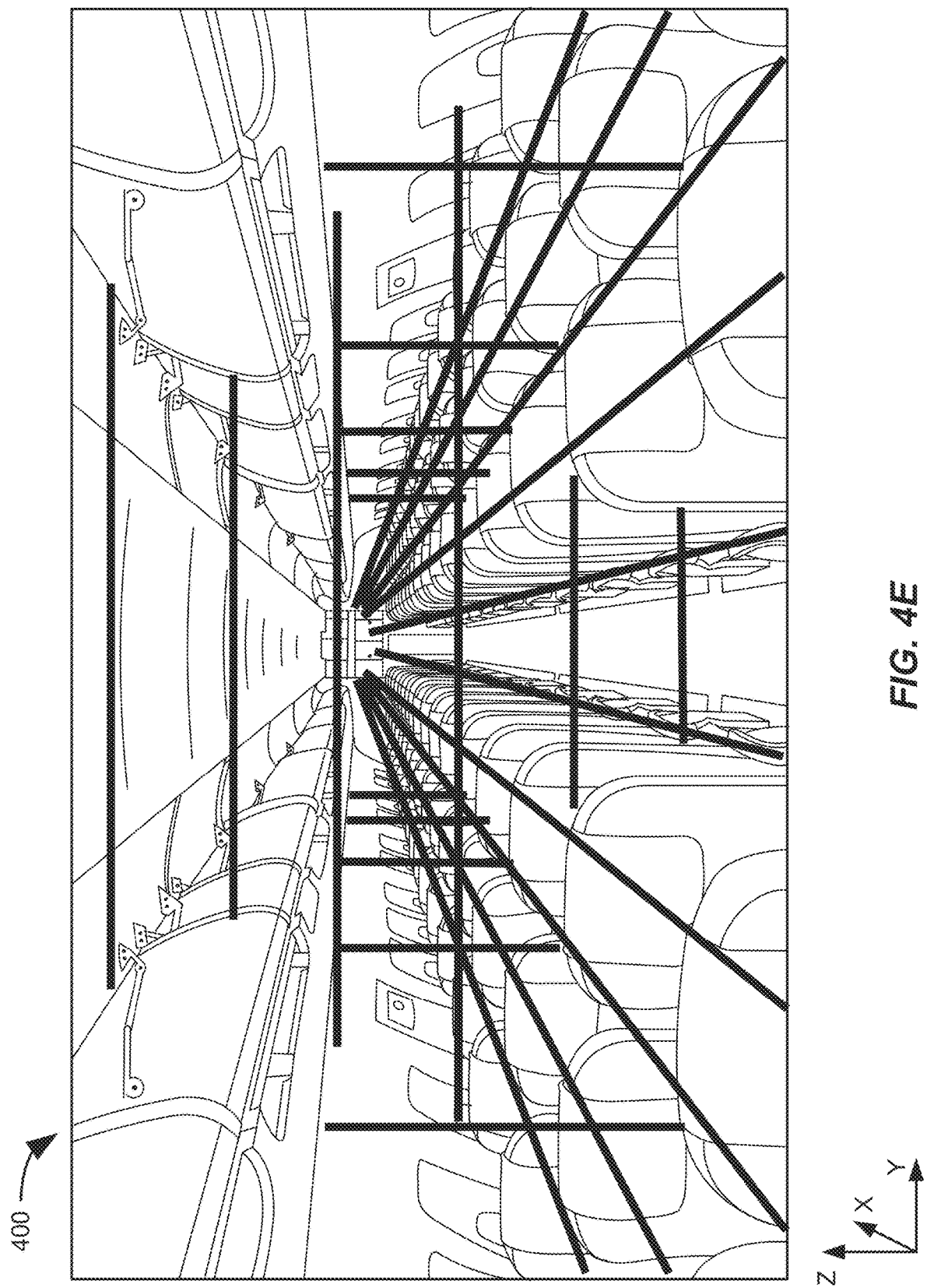

Each set of parallax lines may be created and stored on separate video layers and/or levels so they may be activated (e.g. turned on/off) as needed. In various embodiments, one or more layers of parallax lines may be activated and displayed over the video and/or image. For example, each of FIGS. 4B-4D may represent a set of parallax lines captured on a channel and stored as meta data associated with the file for image 400. The meta data corresponding to image 400 and parallax lines represented in FIGS. 4B-4D may be aggregated into a single retrievable file for viewing. For example, FIG. 4E depicts image 400 with all overlays, as described in FIGS. 4B-4D, activated and superimposed. Such parallax line overlays may be used for scaling for virtual customer walkthroughs or supporting engineering analysis, etc. Such calibrated parallax lines may give an engineer the ability to quickly geometrically assess the areas for design updates and changes. It may also allow an offsite engineer to accurately measure features that exist on the aircraft without having to physically measure it or searching for legacy drawings.

Figure 4F:
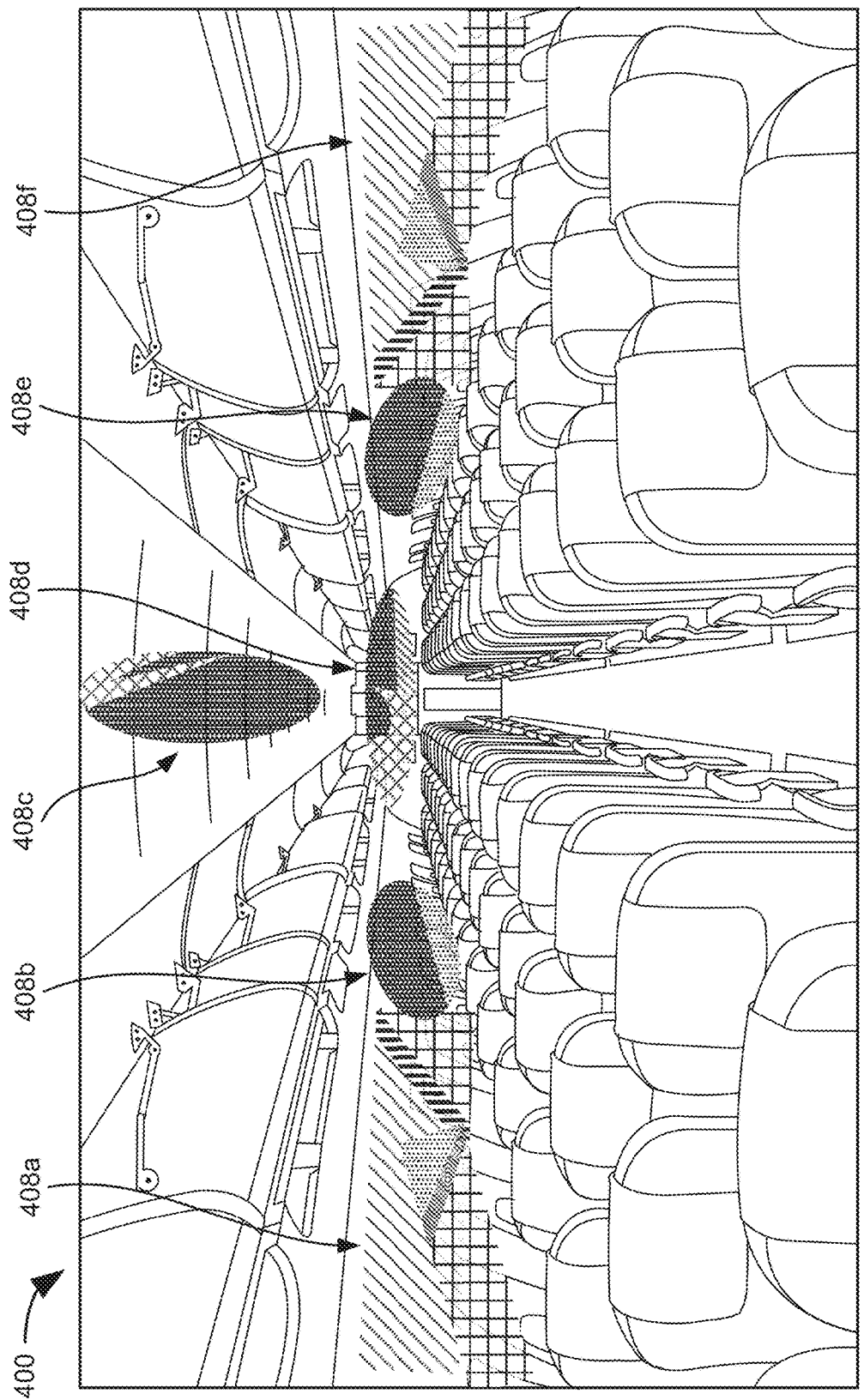

Another type of overlay that may be created and displayed over image 400 is a thermal scan overlay. FIG. 4F depicts image 400 with an integrated thermal scan overlay. The shaded regions 408a-408f represent visualized thermal radiation of a thermogram overlayed upon image 400. The different shaded patterns represent different temperature ranges. Infrared radiation is emitted by all objects with a temperature above absolute zero. The amount of radiation emitted by an object increases with temperature, allowing variations in temperature to be visualized through thermography. In various embodiments, a thermal scan overlay may comprise a thermogram video and/or image of such infrared radiation detected and captured by an infrared vision device mounted to stereoscopic camera 200. For example, an infrared vision device may be a focal plane array (FPA) infrared camera capable of detecting radiation in the mid (3 to 5 μm) and long (7 to 14 μm) wave infrared bands, denoted as MWIR and LWIR, respectively, corresponding to two of the high transmittance infrared windows. In other embodiments, the infrared vision device may be one of various other thermographic cameras or recording devices.

In some embodiments, a thermogram video and/or image may be captured through passive thermography, in which features of interest are naturally at a higher or lower temperature than the background. Alternatively, and or additionally, a thermogram video and/or image may be captured via active thermography in which an energy source is required to produce a thermal contrast between the feature of interest and the background. Active thermography may be necessary in instances where the inspected parts are usually in equilibrium with the surroundings.

Once captured, the thermogram video and/or image may then be stored as a separate overlay layer to image 400 in server 112 and/or database 116, and be activated (e.g. turned on/off) as needed. Such thermal scan overlays may be used for supporting various engineering analyses. For example, thermographic imaging is a non-destructive test method and can be used to measure or observe inaccessible or hazardous areas. It can also be used to detect objects in dark areas. An infrared image that integrates accurate temperature data may provide technicians or engineers with crucial information about the condition of all kinds of equipment and structures. It can be used to find defects in shafts, pipes, and other metal or plastic parts. It is also capable of recording moving targets in real time and allows comparison of temperatures of a large area. As a non-contact measurement that also makes invisible heat issues visible, thermal cameras let technicians, engineers, or other operators inspect production equipment more safely even at peak operation. Along with troubleshooting, thermal scan overlays can also help optimize the production process itself as well as monitor quality control.

In some embodiments, video and/or images may be captured and viewed in real-time. In some embodiments, the overlays described above may also be transmitted in real-time to the viewer. In various embodiments, the images and overlays, such as a thermal scan overlay, previously discussed with reference to FIGS. 4A-4F may be utilized for post-processing analytics. Such post-processing analytics may include automatically identifying foreign object damage ("FOD"), determining assembly compliance, and/or analyzing thermal deviation. These post-processing analytics are further explained below with reference to operation 513 of method 500 described in FIGS. 5A-5B. In some embodiments, the system is configured to create analytic reports by comparing captured images, such as image 300 or 400, against one or more analytic databases.

Examples of Generating Enhanced Stereographic Video of Aircraft Build Processes

Figure 5A:
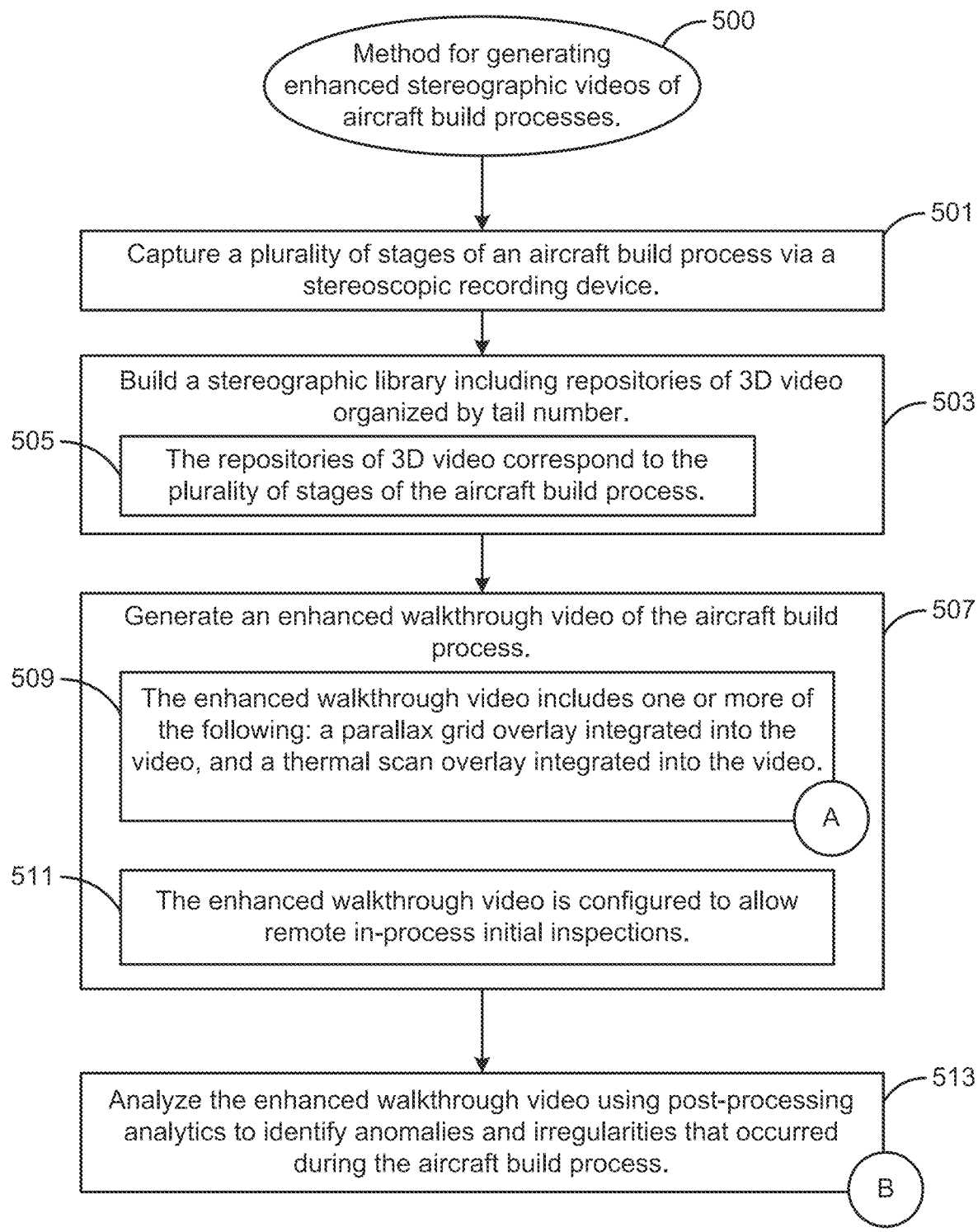
FIGS. 5A-5B illustrate a process flowchart corresponding to a method for generating enhanced stereographic video of aircraft build processes, in accordance with some embodiments.
Figure 5B:
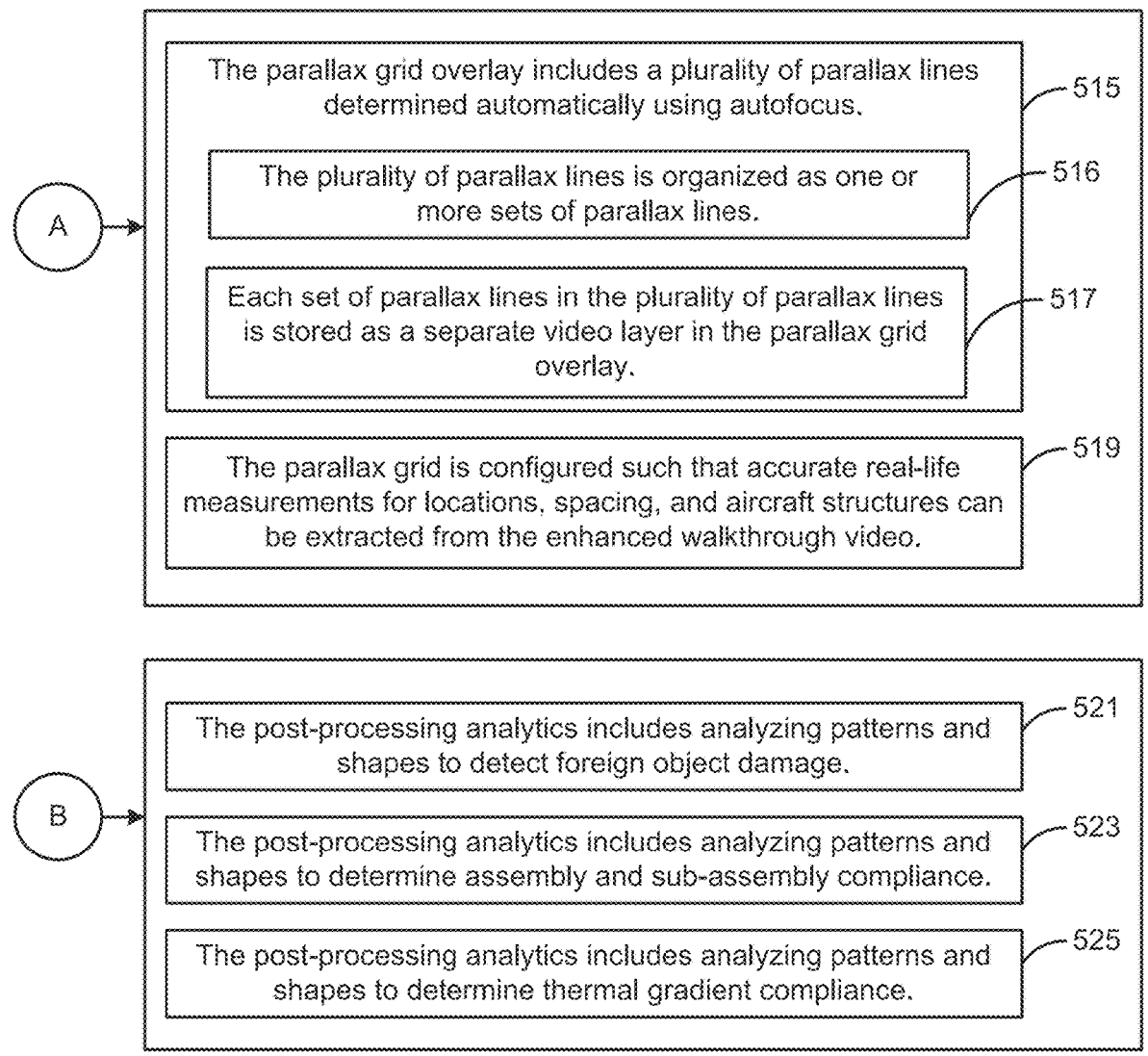

FIGS. 5A-5B illustrate a process flowchart corresponding to method 500 for generating enhanced stereographic video of aircraft build processes, in accordance with some embodiments. Method 500 may be implemented by various embodiments of system 100 described above. In some embodiments, method 500 may be implemented as a specific portion of process 800 described below with reference to FIG. 8, such as at least operations 808, 810, 812, and 814.

At operation 501, a plurality of stages of an aircraft build process are captured via a stereoscopic recording device. In some embodiments, images and/or video of each build process may be captured by recording device 118 or stereoscopic camera 200. Such build processes may include the operations described below with reference to FIG. 8. For example, operation 501 may be implemented to capture video and/or images of the interior and/or exterior of an aircraft during various stages of system integration 810, in which various components and subassemblies manufactured in block 808 are assembled together. In some embodiments, the various stages of system integration 810 may be divided into different build days, such as build day-1 810-A, build day-2 810-B, build day-3 810-C, and so on, to build day-N 810-D. In some embodiments, operation 501 may be implemented to capture video and/or images on an incremental time scale, such as one or more build days during component and subassembly manufacturing 808. In some embodiments operation 501 may be implemented to capture video and/or images of the aircraft at particular milestones which may represent results from one or more build days 810-A to 810-N.

At operation 503, a stereographic library is built, which includes repositories 505 of 3D video organized by tail number. Every aircraft is registered with a unique identifying combination of letters and numbers which must be displayed on the outside of the aircraft. Organizing the stereographic library by tail number may make it more convenient to find the videos and images corresponding to the desired aircraft. In some embodiments, a customer's access to videos and images may be limited to those corresponding to tail numbers of aircraft purchased by such customer. In some embodiments, the repositories 505 of 3D video correspond to the plurality of stages of the aircraft build process. As previously described, such stages of the aircraft build process may be further described below with reference to FIG. 8.

At operation 507, an enhanced walkthrough video 507 of the aircraft build process is generated. In some embodiments, an enhanced walkthrough video 507 is generated for each stage of the build process. In some embodiments, an enhanced walkthrough video 507 may include a plurality of stages of the build process. In some embodiments, the enhanced walkthrough video 507 includes one or more of the following: a parallax grid overlay 515 integrated into the video, and a thermal scan overlay integrated into the video.

The parallax grid overlay 515 may include a plurality of parallax lines determined automatically using autofocus. As previously described, a laser projection device may be mounted onto stereoscopic camera 200 as a mounted device 210. The laser projection device may be configured with autofocus capabilities to create a grid of defined lines in any of the perpendicular axes (e.g., X-axis, Y-axis, and Z-axis). In some embodiments, the parallax lines may be any combination of one or more of the parallax lines previously described with reference to FIGS. 4B-4E, such as station-lines 402a-402j, butt-lines 404a-404f, water-lines 406a-406j, etc. In some embodiments, each type of parallax line is captured on a specific channel. The plurality of parallax lines may be organized as one or more sets 516 of parallax lines. Each set 516 of parallax lines in the plurality of parallax lines may be stored as a separate video layer 517 in the parallax grid overlay 515. The sets of parallax lines may be stored as meta data attached to the video and/or image format. In some embodiments, the captured data may be aggregated into a single file retrievable for viewing. In some embodiments, a set 516 of parallax lines includes one or more of one type of parallax lines. In some embodiments, a set 516 of parallax lines may include any combination of one or more of the parallax lines previously described.

In some embodiments, the parallax grid is configured such that accurate real-life measurements 519 for locations, spacing, and aircraft structures can be extracted from the enhanced walkthrough video 507. For example, as previously described with reference to FIGS. 4B-4E, station-lines may be evenly spaced at some predetermined distance (e.g., 5", 10", 12", 18", etc.) and can provide perspective for horizontal distances of the structure in the Y-axis. Similarly, evenly spaced butt-lines may provide perspective for vertical distances of the structure in the Z-axis. Additionally, evenly spaced water-lines may provide perspective for longitudinal distances of the structure in the X-axis.

As also previously described, a thermal scan overlay may be captured by an infrared vision device, such as a thermographic camera, mounted to stereoscopic camera 200 as a mounted device 210. The thermogram video and/or images captured may be stored as one or more overlays that may be displayed over an image, such as image 400. In some embodiments, a thermal scan overlay may reveal temperature variations so clearly that the underlying image 400 is not necessary for analysis. Thus, an engineer or other technician may only need to view the thermal scan overlay. Other overlays may additionally, and/or alternatively, be created by other mounted devices 210 that measure other information corresponding to the surroundings of stereoscopic camera 200.

In some embodiments, the enhanced walkthrough video 509 is configured to allow remote in-process initial inspections 511. This novel method provides a solution for a customer to review the product at any point in the manufacturing build cycle (as described in FIG. 8). A customer may use a client device 102-108 (e.g. iPad, mobile device, laptop, or smart glasses etc.) and view remote walkthroughs of previously recorded product intervals. In some embodiments, the system may allow the customer to experience a real-time interactive session in a second mode. This may allow a customer to identify potential issues with customer requirements and/or to change previously selected options before a significant amount of time and cost is expended. Initial inspections 511 may also be used by technicians or engineers for engineering analyses. The image data can be analyzed to identify deviations to customer requirements, to identify thermal variations of the assembly, and to perform inspections of the assembly. For example, calibrated parallax lines may give an engineer the ability to quickly measure and geometrically assess the areas for design updates and changes. As another example, thermal scan overlays can assist in identifying anomalies and other mechanical and/or electrical issues.

Furthermore, post-processing analytics may be used to automatically identify potential issues during the build process. At operation 513, the enhanced walkthrough video 507 is analyzed using post-processing analytics to identify anomalies and irregularities that occurred during the aircraft build process. In some embodiments, the post-processing analytics includes analyzing patterns and shapes to detect foreign object damage 521. Foreign object damage ("FOD") is any damage attributed to a foreign object that can be expressed in physical or economic terms and may or may not degrade the product's required safety or performance characteristics. FOD may describe both the damage done to an aircraft by foreign objects, and the foreign objects themselves. Foreign objects may be any object that is not part of the aircraft or vehicle, such as various tools, cell phones, badges, food, etc. In some embodiments, an FOD Database is stored within server 112 and/or database 116. The FOD Database may include a library of anomalous shapes corresponding to foreign objects commonly found in an aircraft during various build processes, including cell-phone objects, badges, keys, tools, rivets, brackets, wire or hydraulic scraps, etc. In some embodiments, the library includes information relating to such foreign objects, including shapes corresponding to various perspectives, sizing, coloration, etc. of the foreign objects. During post-processing, an image, such as image 400, may be scanned for such foreign objects by matching anomalous shapes in the image with the information stored in the FOD Database. For example, the system may identify a screw-driver or a wrench that was left on the aircraft. In some embodiments, the system may be configured to search for specific foreign object types.

In some embodiments, the post-processing analytics includes analyzing patterns and shapes to determine assembly and sub-assembly compliance 523. For each aircraft and build-stage there may be expected shapes for assemblies, sub-assemblies, and customer unique options. These shapes may be derived from the computer-aided design and computer-aided manufacturing (CAD/CAM) system which maintains the "as-built" configuration of an aircraft. Such expected shapes may be stored in a Standard (expected) Shape Database within server 112 and/or database 116. For example, a Standard Shape Database may include shape information relating to seats, tables, lavatories, overhead compartments, and other standard structures of an aircraft. During post-processing, an image, such as image 400, may be scanned for such standard structures by matching the shapes in the image with the shape information stored in the Standard Shape Database in order to confirm correct proper installation of the various structures. For example, assembly compliance may be executed to confirm that lavatories are installed correctly in the expected position.

In some embodiments, the post-processing analytics includes analyzing patterns and shapes to determine thermal gradient compliance 525. For each aircraft and build-stage there may be expected temperature gradients of various areas of the aircraft. Temperatures which deviate from the normal can indicate an electrical or mechanical problem. Such expected temperature gradient information may be stored in a Thermal (expected) Heat Database within server 112 and/or database 116. During post-processing, a thermal scan overlay, such as that previously described in conjunction with FIG. 4F, may be searched and compared with the Thermal Heat Database to identify temperature gradients that are not in compliance within thresholds of expected temperatures. For example, the thermal behavior of a cabin light from an image, such as image 400, with a thermal scan overlay may be checked against the Thermal Heat Database to validate that the thermal gradient temperature is consistent with the expected thermal behavior of a cabin light.

Figure 6:
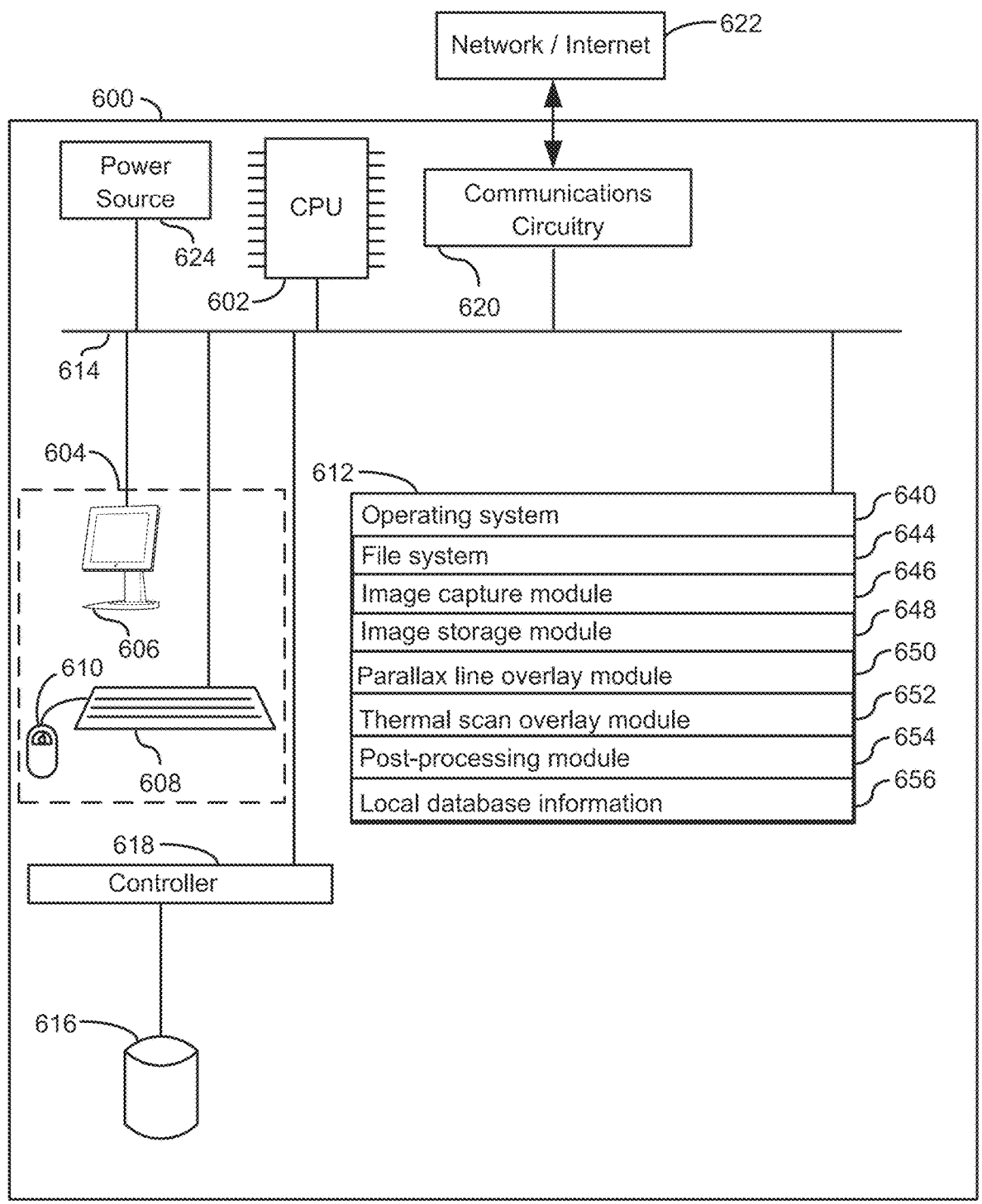
FIG. 6 is a block diagram illustrating an example of a computer system capable of implementing various processes described in the present disclosure.

FIG. 6 is a block diagram illustrating an example of a computer system 600 capable of implementing various processes described in the present disclosure. The system 600 typically includes a power source 624; one or more processing units (CPU's) 602 for executing modules, programs and/or instructions stored in memory 612 and thereby performing processing operations; one or more network or other communications circuitry or interfaces 620 for communicating with a network 622; controller 618; and one or more communication buses 614 for interconnecting these components. In some embodiments, network 622 may be a wireless and/or wired network, such as network 110 previously described in FIG. 1. In some embodiments, network 622 can be another communication bus, the Internet, an Ethernet, an Intranet, other wide area networks, local area networks, and metropolitan area networks. Communication buses 614 optionally include circuitry (sometimes called a chipset) that interconnects and controls communications between system components. System 600 optionally includes a user interface 604 comprising a display device 606, a keyboard 608, and a mouse 610.

Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices 616 remotely located from the CPU(s) 602. In some embodiments, memory 116 may comprise one or more storage devices 616.

Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 640 that includes procedures for handling various basic system services and for performing hardware dependent tasks;
- a file system 644 for storing various program files;
- an image capture module 646 for receiving 3D stereographic video and/or images, such as image 400, from a recording device 118, such as stereographic camera 200, as described in operation 501;
- an image storage module 648 for storing the captured video and/or images in memory 612, storage device 616, and/or database 116, and for organizing the video and/or images as repositories corresponding to tail number, as described in operation 503;
- a parallax line overlay module 650 for receiving data corresponding to projected lines from stereoscopic camera 200 and/or mounted device 210 comprising a laser projection device, and storing the data as an overlay corresponding to the associated image in memory 612, storage device 616, and/or database 116, as described in operation 507;
- a thermal scan overlay module 652 for receiving data corresponding to thermographic imaging captured by mounted device 210 comprising an infrared vision device, and storing the data as an overlay corresponding to the associated image in memory 612, storage device 616, and/or database 116, as described in operation 507;
- a post-processing module 654 for comparing shapes and patterns stored in memory 612, storage device 616, and/or database 116 against the shapes and patterns in a captured image and/or overlay in order to automatically identify foreign object damage ("FOD"), determine assembly compliance, and/or analyze thermal deviation as described in operation 513; and
- local database information 656 comprising aircraft identification information, operating parameters, measurements, anomalous shapes corresponding to foreign objects, expected shapes corresponding to proper components and/or structures, temperature gradient information, and/or other manufacturing information.

Each of the above identified elements may be stored in one or more of the previously mentioned memory devices, and corresponds to a set of instructions for performing a function described above. One or more of the above identified modules may operate by retrieving input from one or more client devices 102-108 and/or local storage 616 or other databases on network 622, such as database 116. The above identified modules or programs (i.e., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "system for generating enhanced stereographic videos of aircraft build processes," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a system for generating enhanced stereographic videos of aircraft build processes and how features are allocated among them will vary from one implementation to another, and may depend in part on the amount of data traffic that the system must handle during peak usage periods as well as during average usage periods.

Examples of Aircraft and Methods of Fabricating and Operating Aircraft

Figure 7:
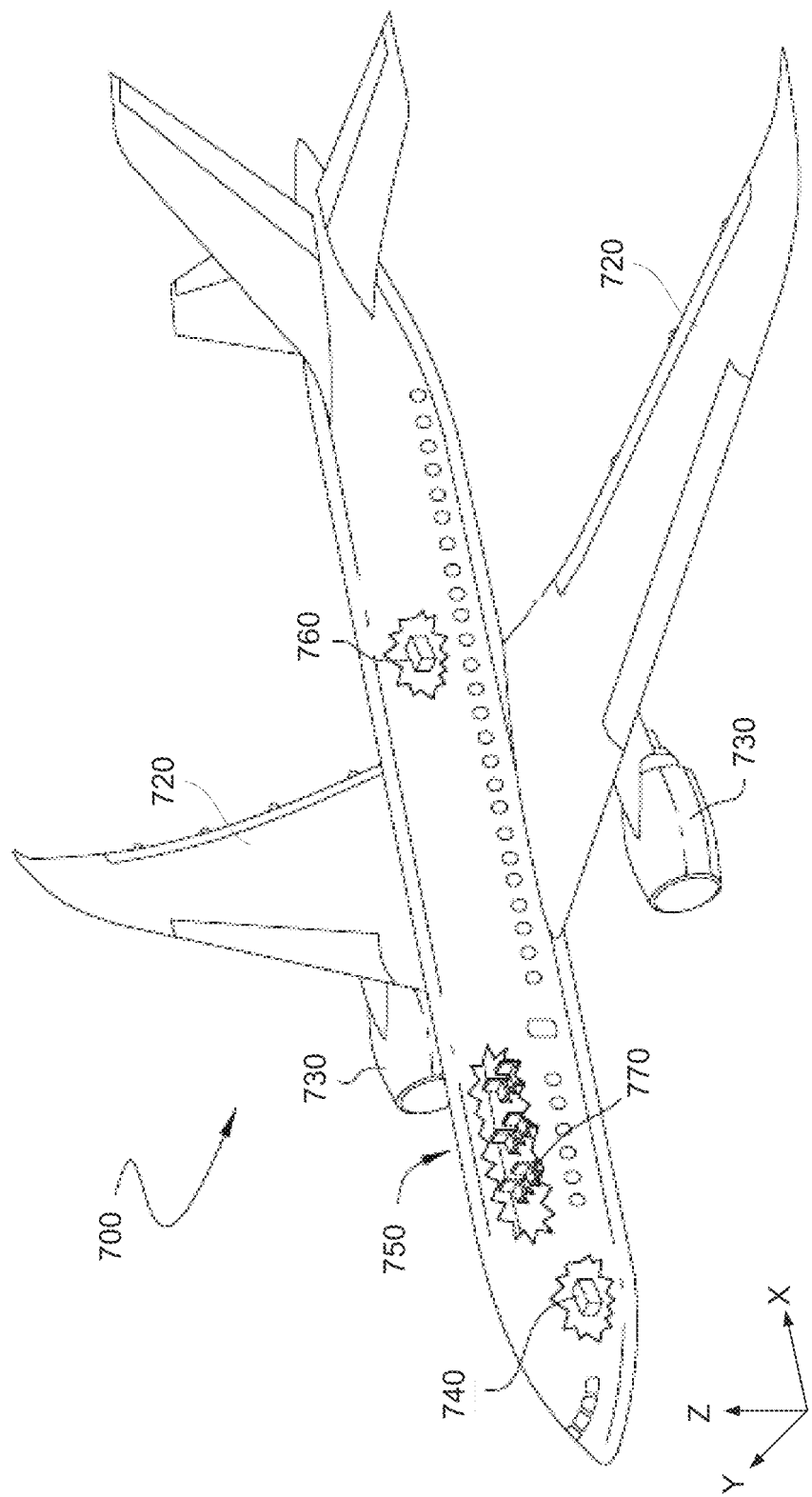
FIG. 7 is a schematic illustration of an aircraft, in accordance with some embodiments.

To better understand various aspects of implementation of the described systems and techniques, a brief description of an aircraft and aircraft wing is now presented. FIG. 7 is a schematic illustration of aircraft 700, in accordance with some embodiments. As depicted in FIG. 7, aircraft 700 is defined by a longitudinal axis (X-axis), a lateral axis (Y-axis), and a vertical axis (Z-axis). In various embodiments, aircraft 700 comprises airframe 750 with interior 770. Aircraft 700 includes wings 720 coupled to airframe 750. Aircraft 700 may also include engines 730 supported by wings 720. In some embodiments, aircraft 700 further includes a number of high-level inspection systems such as electrical inspection system 740 and environmental inspection system 760. In other embodiments, any number of other inspection systems may be included.

Aircraft 700 shown in FIG. 7 is one example of a vehicle for which an enhanced stereographic video may be generated at various stages of the build process, such as by system 100 by implementation of method 500, in accordance with illustrative embodiments. Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

Figure 8:
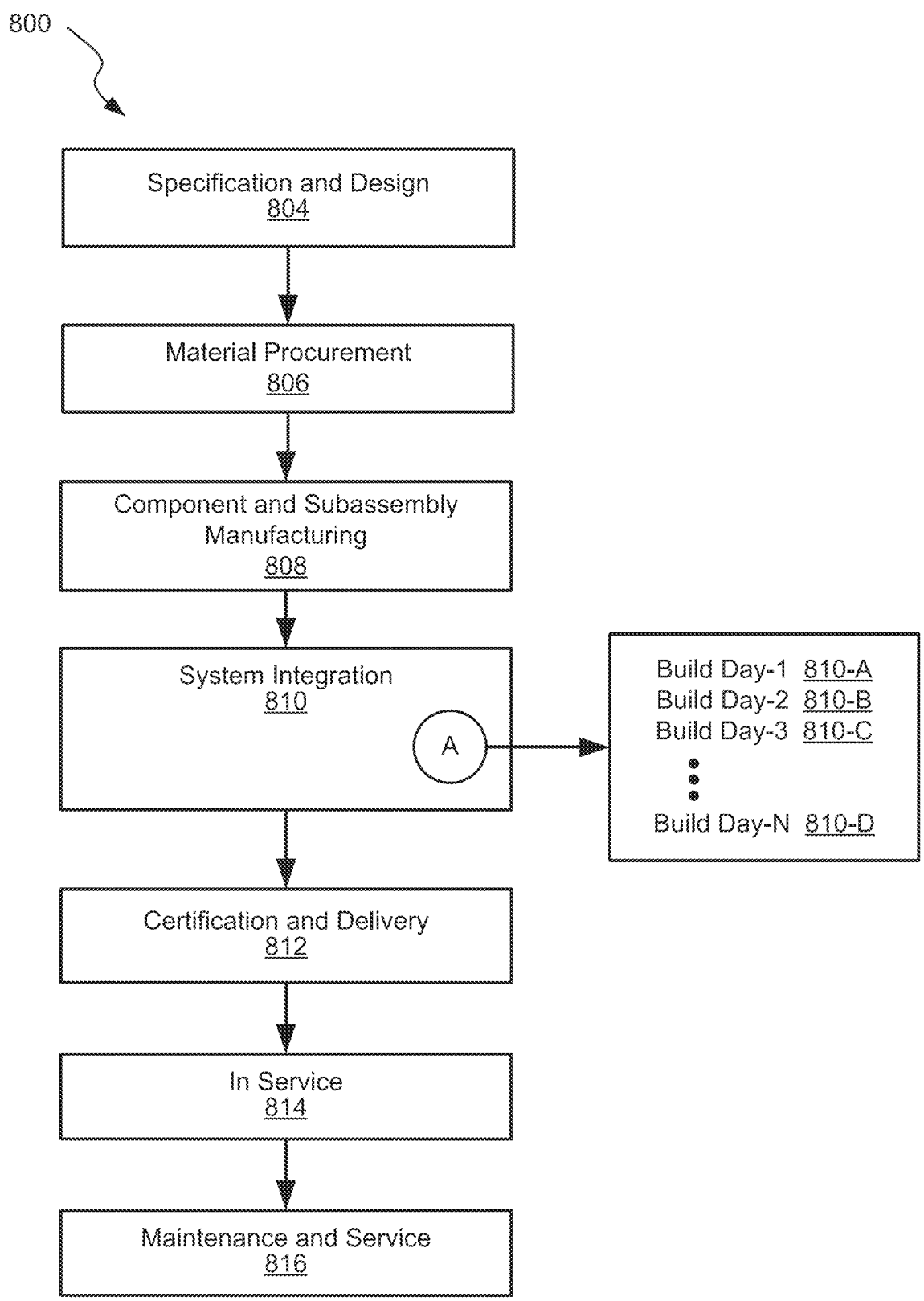
FIG. 8 is a block diagram of aircraft production and service methodology that may utilize methods and assemblies described herein.

Examples of the present disclosure may be described in the context of aircraft manufacturing and service method 800 as shown in FIG. 8 and aircraft 700 as shown in FIG. 7. During pre-production, illustrative method 800 may include specification and design (block 804) of aircraft 700 and material procurement (block 806). During production, component and subassembly manufacturing (block 808) and system integration (block 810) of aircraft 700 may take place. In some embodiments, system integration (block 810) may comprise one or more designated build days, including build day-1 810-A, build day-2 810-B, build day-3 810-C, and up to build day-N 810-D. In some embodiments, component and subassembly manufacturing (block 808) and system integration (block 810) may occur concurrently. For example, as various components and/or subassemblies complete manufacturing in block 808, they may be integrated into the aircraft at block 810 while other components and/or subassemblies are being manufactured in block 808. Described systems, methods, and assemblies formed by these methods, can be used in any of specification and design (block 804) of aircraft 700, material procurement (block 806), component and subassembly manufacturing (block 808), and/or system integration (block 810) of aircraft 700.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 700. Described systems, methods, and assemblies formed by these methods, can be used in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 800). For example, components or subassemblies corresponding to component and subassembly manufacturing (block 808) may be fabricated or manufactured in a manner similar to components or subassemblies produced while aircraft 700 is in service (block 814). Also, one or more examples of the apparatus(es), method(s), or combination thereof may be utilized during production stages (block 808) and (block 810), for example, by substantially expediting assembly of or reducing the cost of aircraft 700. Similarly, one or more examples of the apparatus or method realizations, or a combination thereof, may be utilized, for example and without limitation, while aircraft 700 is in service (block 814) and/or during maintenance and service (block 816).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:
1. A system, comprising:
one or more processors;
memory; and
one or more programs stored in the memory, the one or more programs comprising instructions for:
building a stereographic library including repositories of 3D video, the repositories of 3D video corresponding to a plurality of stages of an aircraft build process;
generating an enhanced walkthrough video of the aircraft build process, the enhanced walkthrough video including a parallax grid overlay integrated into the video, the parallax grid overlay including a plurality of parallax lines, wherein each set of parallax lines can be activated or deactivated as needed; and
analyzing the enhanced walkthrough video using post-processing analytics.

2. The system of claim 1, wherein the post-processing analytics includes analyzing patterns and shapes to detect foreign object damage.

3. The system of claim 1, wherein the post-processing analytics includes analyzing patterns and shapes to determine assembly and sub-assembly compliance.

4. The system of claim 1, wherein the post-processing analytics includes analyzing patterns and shapes to determine thermal gradient compliance.

5. The system of claim 4, wherein determining thermal gradient compliance includes matching thermal heat to a thermal heat database storing therein expected temperature gradient information, for example stored within a server and/or database.

6. The system of claim 1, wherein the system is further configured to provide remote in-process initial inspections capabilities.

7. The system of claim 1, wherein the parallax grid overlay is configured such that accurate real-life measurements for locations, spacing, and aircraft structures can be extracted from the enhanced walkthrough video.

8. The system of claim 1, wherein the post-processing analytics includes scanning an image for standard structures by matching the shapes in the image with shape information stored in a standard shape database in order to confirm correct proper installation of structures.

9. The system of claim 8, wherein the standard shape database has stored therein expected shapes, for example stored within a server and/or database.

10. The system of claim 9, wherein the expected shapes comprise expected shapes for any one or more of: assemblies, sub-assemblies, and customer unique options, and wherein optionally the expected shapes are derived from a computer-aided design and/or computer-aided manufacturing system which maintains the "as-built" configuration of an aircraft.

11. A method comprising:
building a stereographic library including repositories of 3D video, the repositories of 3D video corresponding to a plurality of stages of an aircraft build process,
generating an enhanced walkthrough video of the aircraft build process, the enhanced walkthrough video including a parallax grid overlay integrated into the video, the parallax grid overlay including a plurality of parallax lines, wherein each set of parallax lines can be activated or deactivated as needed; and
analyzing the enhanced walkthrough video using post-processing analytics.

12. The method of claim 11, wherein the post-processing analytics includes analyzing patterns and shapes to detect foreign object damage.

13. The method of claim 11, wherein the post-processing analytics includes analyzing patterns and shapes to determine assembly and sub-assembly compliance.

14. The method of claim 11, wherein the post-processing analytics includes analyzing patterns and shapes to determine thermal gradient compliance.

15. The method of claim 14, wherein determining thermal gradient compliance includes matching thermal heat to a thermal heat database storing therein expected temperature gradient information, for example stored within a server and/or database.

16. The method of claim 11, wherein the enhanced walkthrough video is configured to allow remote in-process initial inspections.

17. The method of claim 11, wherein the parallax grid is configured such that accurate real-life measurements for locations, spacing, and aircraft structures can be extracted from the enhanced walkthrough video.

18. The method of claim 11, wherein the post-processing analytics includes scanning an image for standard structures by matching the shapes in the image with shape information stored in a standard shape database in order to confirm correct proper installation of structures.

19. The method of claim 11, wherein the standard shape database has stored therein expected shapes, for example stored within a server and/or database.

20. A non-transitory computer readable storage medium storing one or more programs configured for execution by a computer, the one or more programs comprising instructions for:
building a stereographic library including repositories of 3D video, the repositories of 3D video corresponding to a plurality of stages of an aircraft build process;
generating an enhanced walkthrough video of the aircraft build process, the enhanced walkthrough video including a parallax grid overlay integrated into the video, the parallax grid overlay including a plurality of parallax lines, wherein each set of parallax lines can be activated or deactivated as needed; and
analyzing the enhanced walkthrough video using post-processing analytics.

* * * * *